(12) United States Patent
Borrelli et al.

(10) Patent No.: US 6,284,685 B1
(45) Date of Patent: Sep. 4, 2001

(54) LIGHT-INDUCED REFRACTIVE INDEX CHANGES IN LOW TEMPERATURE GLASSES

(75) Inventors: Nicholas F. Borrelli, Elmira; Robert W. Boyd; Stojan Radic, both of Rochester, NY (US); Paul A. Tick, Corning, all of NY (US)

(73) Assignee: Corning Incorporated, Corningm, NY (US)

(*) Notice: Subject to any disclaimer, the term of this patent is extended or adjusted under 35 U.S.C. 154(b) by 0 days.

(21) Appl. No.: 09/509,291
(22) PCT Filed: Sep. 25, 1998
(86) PCT No.: PCT/US98/19963
§ 371 Date: Mar. 23, 2000
§ 102(e) Date: Mar. 23, 2000
(87) PCT Pub. No.: WO99/18042
PCT Pub. Date: Apr. 15, 1999

Related U.S. Application Data

(60) Provisional application No. 60/060,845, filed on Oct. 2, 1997.

(51) Int. Cl.$^7$ ............... C03C 3/247; C03B 37/10; C03B 37/15
(52) U.S. Cl. ............... 501/45; 501/37; 501/44; 65/392; 385/123; 385/130; 385/141
(58) Field of Search ............... 501/37, 44, 45; 65/392; 385/123, 130, 141

(56) References Cited

U.S. PATENT DOCUMENTS

| | | |
|---|---|---|
| 4,314,031 | 2/1982 | Sanford et al. . |
| 4,379,070 | 4/1983 | Tick . |
| 5,028,105 | 7/1991 | Drexhage et al. . |
| 5,157,747 | 10/1992 | Aktins et al. . |
| 5,218,655 | 6/1993 | Mizrahi . |
| 5,491,570 | 2/1996 | Rakuljic . |
| 5,500,031 | 3/1996 | Aktins et al. . |

*Primary Examiner*—Karl Group
(74) *Attorney, Agent, or Firm*—Svetlana Short

(57) ABSTRACT

Devices are made comprising a tin-phosphorous oxyfluoride glass, which has been exposed to light, preferably shorter in wavelength than the absorption edge of the glass, to change the refractive index change of the glass. The glasses can be used to form planar and fiber devices, including core/clad structures for guiding light.

20 Claims, No Drawings

LIGHT-INDUCED REFRACTIVE INDEX CHANGES IN LOW TEMPERATURE GLASSES

This application is a 371 of PCT/US98/19963 filed Sep. 25, 1998which claims benefit of Prov. No. 60/060,845 filed Oct. 2, 1997.

FIELD OF THE INVENTION

The present invention relates to light-induced refractive index changes in materials. More particularly, the present invention relates to a low temperature glass exhibiting light-induced refractive index changes.

BACKGROUND OF THE INVENTION

The term "photorefraction" has been used to describe the phenomenon where the refractive index of a material is altered upon exposure to light. Initially, the phenomenon was observed in a certain restricted class of crystalline materials that were photoconductive and exhibited large polar effects. An example of such a material is $LiNbO_3$. There is also a version of this type of "photorefractive" behavior that can be obtained in organic polymeric materials. In these polymeric materials, the various photosensitive agents are added to the polymer in a guest-host format.

More recently, a new class of materials have been reported to exhibit significant "photorefractive" behavior. These materials are glasses in the family $xSiO_2$—$(1-x)GeO_2$. The origin of the effect in these materials is totally different from that of the ferroelectric crystals mentioned above. An excimer laser (193 nm and 248 nm) induces a refractive index change in these materials, and the refractive index change stems from large absorption changes originating from "defects" in the glass structure. Because the effect was originally discovered in a single mode optical fiber and, since the major application of the induced index change has been to fabricate phase gratings in the fiber, this "photorefractive" behavior is often referred to as "fiber Bragg gratings" in the technical literature. The effect has been reported to have been extended to other binary $SiO_2$ compositions such as $P_2O_5$, SnO, and $Ce_2O_3$. By far the largest induced refractive index change has been in the $SiO_2$—$GeO_2$ system where values as large as 0.001 have been reported. The size of the refractive index effect may be increased in the $SiO_2$—$GeO_2$ system by impregnating the glass with molecular hydrogen before exposure.

Tin-phosphorous oxyfluoride glasses are known and are disclosed in U.S. Pat. Nos. 4,314,031 and 4,379,070, which are relied upon and incorporated herein by reference. U.S. Pat. No. 4,314,031 discloses that tin-phosphorous oxyfluoride glasses desirably have a very low glass transition temperature, frequently below 100° C., yet still exhibit excellent resistance to attack by moisture at elevated temperatures. U.S. Pat. No. 4,379,070 discloses the use of tin-phosphorous oxyfluoride glasses as a matrix material for the support of photosensitive and electric-field-responsive polycyclic aromatic hydrocarbon compounds. Neither of these patents, however, discloses or suggests that tin-phosphorous oxyfluoride glasses exhibit a "photorefractive" effect or the use of tin-phosphorous oxyfluoride glass as a photorefractive material.

It would also be useful to provide a material that exhibits a "photorefractive" effect that could be doped with a variety of materials for altering the optical properties of the devices made from the material, including inorganic and organic dopants.

SUMMARY OF INVENTION

The present invention involves a tin-phosphorous oxyfluoride glass system that exhibits a large "photorefractive" effect by a mechanism different from either of the crystalline or silica-germania classes mentioned above. It has been discovered that exposure of tin-phosphorous oxyfluoride glass to light of a wavelength shorter than the absorption region of the glass for a sufficient amount of time shows little or no absorption changes, yet can exhibit refractive index changes greater than about 0.0004. A wide variety of devices may be fabricated from tin-phosphorous oxyfluoride glass which has been exposed to light of a wavelength shorter than the absorption region of the glass.

Accordingly, the present invention generally provides a device and a method of making a device comprising tin-phosphorous oxyfluoride glass which has been exposed to light for a time sufficient to change the refractive index the glass. Preferably the wavelength of the light is shorter than about 350 nm, which roughly corresponds to the absorption edge of the glass. The composition of the tin-phosphorous oxyfluoride glass may comprise, in weight percent on an elemental basis as calculated from the batch, about 20–85% Sn, 2–20% P, 3–20% O, 9–36% F, and at least 60% total of Sn+P+O+F. The composition may further include about 0–40% cation modifiers and about 0–20% anion modifiers. The glasses for making the devices of the present invention may further be doped with a optically nonlinear organic dye to alter the optical properties of the glasses.

In one aspect of the invention, the device may include an optical waveguide region. In another aspect of the invention, the device may include a periodic refractive index structure, such as a diffraction grating. Accordingly, the devices of the present invention may be formed into a variety of shapes, including planar and fiber forms. Gratings and waveguides may be formed by changing the refractive index of selected portions of the glass, which may be achieved by exposing the selected portion to light shorter than the absorption edge of the glass. For example, an optical interference pattern may be utilized to form a grating, or the glass may be selectively masked to provide a periodic refractive index structure in the glass.

Several important advantages will be appreciated from the foregoing summary. One advantage of the device and method of the present invention is providing a photorefractive device made from a glass material that has a low glass transition temperature and is resistant to moisture. The present invention also provides a photorefractive material that can be doped with wide variety of materials such as optically nonlinear organic dies, which can be used to dynamically alter the optical properties of the devices. Another advantage is the ability to form photorefractive devices into planar devices and fibers, including devices having gratings and/or core/clad structures for guiding light.

Additional features and advantages of the invention will be set forth in the description which follows. It is to be understood that both the foregoing general description and the following detailed description are exemplary and explanatory and are intended to provide further explanation of the invention as claimed.

DETAILED DESCRIPTION

Reference will now be made in detail to the present preferred embodiment of the invention. The present invention provides a device and a method for making the same.

The device of the present invention comprises tin-phosphorous oxyfluoride glass, which has been exposed to light for a time sufficient to change the refractive index change of the glass. The light is preferably shorter in wavelength than 350 nm, which roughly corresponds to the absorption edge of the glass.

Reference is made to U.S. Pat. Nos. 4,314,031 and 4,379,070, for a more detailed understanding of processing of tin-phosphorous oxyfluoride glass compositions. As disclosed in those patents, tin-phosphorous oxyfluoride glasses can be made from conventional batch materials such as $SnF_2$, $P_2O_5$, $Sn_3(PO_4)_2$, SnO, $NH_4H_2PO_4$, $NH_4PF_6$ and $Sn_2P_2O_7$ and can be melted at temperatures not exceeding 600° C. Preferably, however, to provide glasses exhibiting the photorefractive effect, the compositions should be melted at temperatures below 450° C., and for some compositions, as demonstrated by the example, preferably below 400° C.

As also noted in the patents, the tin-phosphorous oxyfluoride glass system may include a variety of additional optional constituents including alkali metals, alkaline earth metals, group II metals such as zinc and cadmium, group II elements such as La, Ce, B and Al, group IV elements such as Pb, Zr, Ti, and Ge, group V elements such as Sb and Nb, group VI elements such as Mo and W, group VII elements such as Cl, Br and I, and group VIII metals such as Gd. Reference may be made to U.S. Pat. Nos. 4,314,031 and 4,379,070 for a further description of glass compositions in the tin-phosphorous oxyfluoride composition system, most of which are believed suitable for use in the present invention.

Glasses suitable for producing photorefractive devices may be prepared from commercial grade batch chemicals, melted in any suitable melting unit, for example, a nickel, alumina, gold or vitreous carbon crucible, and formed by pressing, casting, blowing, molding, evaporation, drawing, and the like.

The composition of the tin-phosphorous oxyfluoride glass used to make the devices of the present invention may comprise, in weight percent on an elemental basis as calculated from the batch, about 20–85% Sn, 2–20% P, 3–20% O, 9–36% F, and at least 60% total of Sn+P+O+F. More preferably, the composition of the glass used to make the devices of the present invention may comprise about 20–60% Sn, 9–20% P, 10–20% O, 9–20% F, and at least 60% total of Sn+P+O+F. The tin-phosphorous oxyfluoride glass may further include about 0–40% total of cation modifiers selected in the indicated proportions from the group consisting of about up to 12% Pb, up to 12% Zr, up to 5% Ca, up to 8% Ba, up to 5% Zn, up to 30% Tl, up to 7% Nb, up to 5% Ga, up to 5% Hg, and up to 4% total alkalis, such as Li, Na, K, Rb, and Cs. The glass composition may further include up to about 0–20% total anion modifiers selected from the group consisting of Cl, Br and I.

The glass compositions may further be doped with optically nonlinear organic dyes, such as acridine or rhodamine dyes. Such doping may provide optical property modifications, such as, for example, nonlinear optical effects. The optically nonlinear organic dyes may be present in an amount of about 0.1%.

As mentioned above, the devices of the present invention comprise tin-phosphorous oxyfluoride glass which has been exposed to light, preferably shorter than about 350 nm, which generally corresponds to the absorption edge of the glass, for a time sufficient change the refractive index of the glass. The exact wavelength selected to change the refractive index will depend on the composition of the glass and the glass processing conditions, which may be determined by experimentation. The intensity of the light and duration of the exposure to the light will depend on the desired refractive index change, and to a lesser extent, the thickness of the glass.

In one aspect of the invention, the device of the present invention may include a grating and/or a waveguide region such as a core/clad structure. Accordingly, the devices of the present invention may be fabricated into a variety of shapes, including planar and fiber forms. Thus, the glasses of the present invention may be utilized to fabricate a variety of devices such as optical fibers, lenses, planar waveguides, lightwave optical circuits, and a variety of planar devices.

A planar or fiber waveguide having core/clad structure for guiding light may be formed by exposing a portion of the glass to change the refractive index of the portion. For example, an optical fiber made from tin-phosphorous oxyfluoride glass comprising a high index core region surrounded by a lower index cladding glass may be formed by changing the refractive index of the core and cladding regions. A lens may be formed by locally raising the refractive index of the core at the endface of an optical fiber.

In another aspect, the devices of the present invention may include a periodic refractive index structure, such as a diffraction grating. Gratings may be formed by a variety of techniques. For example, a grating structure may be formed by exposing a bulk piece of glass, in planar or fiber form, to an optical interference pattern. It is known that an optical interference pattern may be formed by combining two or more beams of light. Alternatively, a grating structure may be formed by selectively masking the glass of the present invention to selectively expose a portion of the glass to the light utilized to change the refractive index of the glass.

A variety of compounds can be fabricated with the materials of the present invention, which could find application in such devices including gratings, multiplexers, demultiplexers, filters and switches. A particular advantage of the photorefractive material of the present invention is the ease which the material can be doped with a variety of materials to alter the optical properties of the glass including, for example, organic dyes, as disclosed in 4,379, 070.

The following non-limiting examples provide tin-phosphorous oxyfluoride glass compositions which, when exposed to light, exhibit refractive index changes and may be used to make the devices of the present invention.

EXAMPLE 1

A composition having the formula $56.3SnF_2$—$32.2P_2O_5$—$8.2PbO$—$3.4SnCl_2$, in weight percent, was prepared according to the following procedure. Pb metal was reacted with $NH_4H_2PO_4$ at 450° C. in an uncovered vitreous carbon crucible until completion, which occurs when hydrogen ceases to evolve. This process took about 3 hours, and the reaction rate is about 0.6 g/hr of Pb metal.

The crucible was removed from the furnace and momentarily cooled, then the remaining components ($SnF_2$ and $SnCl_2 \cdot 2H_2O$ were added. The crucible was replaced in the furnace, covered and melted for one hour at temperatures between about 350° C. and about 400° C. The crucible was removed from the furnace and stirred under vacuum (about 28 inches of mercury) for about five minutes at about 275° C. Rigorous foaming may occur at the start of this process, but when it did occur, it quickly subsided and the melt became quite stable. At this point an organic dye can be added to the glass if desired, as disclosed in U.S. Pat. No. 4,379,070.

The melt was then transferred to a gold crucible, covered and replaced at the desired soak temperature for about 15 minutes. If the melts were allowed to cool in vitreous carbon crucibles, instead of gold or other nonreactive crucible, then additional seeds were observed to form at the glass-carbon interface as the melt temperature decreases.

The glasses obtained from the above process contained very few seeds, but were optically nonhomogeneous because of the fluidity of the melts. The only significant shift in the starting composition was loss of about $\frac{1}{3}$ of the batched fluorine, which is stoichiometrically (2 for 1) replaced by oxygen. The cations and chlorine were essentially completely retained.

The glass produced by the above process may be cast into disks, drawn into fibers, or pressed into thin sheets or films. Thin sheets may be made by placing a small drop of the glass onto a preheated microscope slide, silicon wafer or polished silica flat and then pressing the drop into a thin sheet. For the above composition, the glass was pressed into thin sheets at a temperature near about 140° C. between two silica plates. Generally, a temperature of about 75° to about 100° C. above the glass transition temperature is preferred for forming the thin sheets in this manner. To avoid reaction of the hot glass with the substrate used to press the sheets, the substrate may be coated with a non-stick, nonreactive surface such as a coating of gold or TiN.

The glass may then be exposed to a sufficient amount of activating radiation, such as light, to induce a refractive index change in the glass. The activating radiation is preferably light shorter than 350 nm, which roughly corresponds to the absorption edge of the glass. A thin sheet made according to the example described above, was exposed to 309 nm light from a XeCl laser for approximately 30 minutes through a mask to induce a refractive index change and develop a photorefractive pattern. The total flux of the laser was about 10 mJ/m$^2$ at a repetition rate of about 50 Hz. The change in the refractive index of the glass were directly measured by interferometry at 546 nm.

Gratings made from the composition in the above example lasted about four months after exposure at room temperature without degradation of the index pattern. The refractive index pattern in the present example was a diffraction grating with a pitch of about 10 microns. The magnitude of the refractive index change depended on the last temperature the glass was held at before cooling. For the above composition, if the soak temperature was 400° C. or less, a refractive index change was observed after exposure to light shorter than the absorption region of the glass. If the soak temperature was above 400° C., a refractive index change was not observed after exposure to light. However, if the temperature was raised above 400° C., and then lowered to and soaked at 400° C. or less, a refractive index change was observed after exposure to light. Exposure to the 309 nm radiation always discolored the glass to pale yellow, whether or not a refractive index change was observed.

A grating formed on sheet of glass made from the above composition and exposed to 309 nm radiation was measured with an interferometer using a measurement wavelength of 546 nm. A fringe shift corresponding to a change in refractive index of at least 0.0002. The direction of the fringe shift indicated that the refractive index decreased in the areas exposed to the radiation. Glass of the above composition was also exposed to light of a wavelength of about 270 nm, and a refractive index change was also observed in the areas of the glass exposed to the light.

The composition in the above example was modified in an attempt to identify the importance of each of the components. The modifications consisted of increasing and decreasing the cations, Pb and Sn by two atomic percent, as well as increasing and decreasing the anions, F and Cl, by two atomic percent. Raising the Cl content caused the glass to have an opal appearance, but changing the anion content did not significantly effect the change in the refractive index after exposure to light. Increasing Sn decreased the glass transition temperature, but it did not significantly influence the magnitude of the refractive index change. Decreasing the cation percent of Pb decreased the magnitude of the refractive index change, and increasing the amount of Pb above 6 atomic percent caused this glass to devitrify, forming a crystal phase which was identified as cotunnite ($PbCl_2$).

EXAMPLES 2–5

Each of the compositions below, expressed in weight percent, exhibited a change in refractive index when exposed to 309 nm light. Examples 3 and 4 demonstrate that Pb can be substituted with another cation modifier, such as Zn.

|    | 2    | 3    | 4    | 5    |
|----|------|------|------|------|
| Sn | 48.5 | 47.7 | 22.8 | 47.9 |
| P  | 12.1 | 14.5 | 14.3 | 10.7 |
| Pb | 7.1  | 0    | 0    | 10.3 |
| Zn | 0    | 2.7  | 4.2  | 0    |
| Tl | 0    | 0    | 25.6 | 0    |
| F  | 13.0 | 16.4 | 9.7  | 14.9 |
| Cl | 1.2  | 0    | 4.6  | 0.3  |
| O  | 18.0 | 18.6 | 18.6 | 14.9 |

Tin-phosphorous oxyfluoride glass may be doped with an optically nonlinear organic dye to modify the optical properties of the device produced by the glass. About 0.1% of an optically nonlinear dye may be used to dope the glass. For example, doping tin-phosphorous oxyfluoride glass with a saturable absorber, such as acridine, will provide a glass in which transmission of light will depend on the intensity of light. The doped glass may be subsequently exposed to light to alter the refractive index of the glass to produce a variety of devices, such as an optically a periodic grating structure that is tunable depending on incident light intensity.

The change in refractive index effect in tin-phosphorous oxyfluoride glass after exposure to light shorter in wavelength than the absorption edge of the glass is large enough to write gratings and waveguides. The change in refractive index is greater than $2 \times 10^{-4}$ but based on measurements of grating efficiency, it is believed that the index change may be greater than $10^{-3}$, approaching $10^2$. The higher refractive index changes were measured using an optical readout of the diffraction efficiency of a grating made from the glass using a HeNe laser at 633 nm. The gratings made according to the above example could be erased by heating the glass above the glass transition temperature, which is about 80° C. The magnitude of the refractive index change, coupled with the demonstrated ability to introduce organic dyes makes this material an exciting optical material.

It will be apparent to those skilled in the art that various modifications and variations can be made to the device and method of the present invention without departing from the spirit or scope of the invention. Thus, it is intended that the present invention cover the modifications and variations of this invention provided they come within the scope of the appended claims and their equivalents.

What is claimed is:

1. A device comprising tin-phosphorous oxyfluoride glass which has been exposed to light for a time sufficient to change the refractive index of the glass.

2. The device of claim 1, wherein the light is shorter in wavelength than the absorption edge of the glass.

3. The device of claim 2, wherein the tin-phosphorous oxyfluoride glass has a composition which comprises, in weight percent on an elemental basis as calculated from the batch, about 20–85% Sn, 2–20% P, 3–20% O, 9–36% F, and at least 60% total of Sn+P+O+F.

4. The device of claim 3, wherein the tin-phosphorous oxyfluoride glass has a composition which comprises, in weight percent on an elemental basis as calculated from the batch, about 20–60% Sn, 9–20% P, 10–20% O, 9–20% F, and at least 60% total of Sn+P+O+F.

5. The device of claim 4, wherein the tin-phosphorous oxyfluoride glass has a composition consisting essentially of, in weight percent on an elemental basis as calculated from the batch, about 20–60% Sn; 9–20% P; 10–20% O; 9–20% F; 0–40% total cation modifiers selected in the indicated proportions from the group consisting of about up to 12% Pb, up to 12% Zr, up to 5% Ca, up to 8% Ba, up to 5% Zn, up to 30% Ti, up to 7% Nb, up to 5% Ga, up to 5% Hg, and up to about 4% total alkalis; and up to about 20% total of anion modifiers selected from the group consisting of Cl, Br and I.

6. The device of claim 4, wherein the light is shorter than about 350 nm.

7. The device of claim 6, wherein the device includes an optical waveguide region.

8. The device of claim 6, wherein the device includes a diffraction grating.

9. The device of claim 8, wherein the device is in planar form.

10. The device of claim 8, wherein the device is in fiber form.

11. The device of claim 4 further comprising an optically nonlinear organic dye dopant and a periodic grating structure that is tunable depending on incident light intensity.

12. A method of making a device comprising the steps of exposing a tin-phosphorous oxyfluoride glass to light for a time sufficient to induce a refractive index change in the glass.

13. The method of claim 12, wherein the light is shorter in wavelength than the absorption edge of the glass.

14. The method of claim 13, wherein the tin-phosphorous oxyfluoride glass has a composition which comprises, in weight percent on an elemental basis as calculated from the batch, about 20–60% Sn, 9–20% P, 10–20% O, 9–20% F, and at least 60% total of Sn+P+O+F.

15. The method of claim 14, wherein the tin-phosphorous oxyfluoride glass has a composition consisting essentially of, in weight percent on an elemental basis as calculated from the batch, about 20–60% Sn; 9–20% P; 10–20% O; 9–20% F; 0–35% total cation modifiers selected in the indicated proportions from the group consisting of about up to 12% Pb, up to 12% Zr, up to 5% Ca, up to 8% Ba, up to 5% Zn, up to 30% Tl, up to 7% Nb, up to 5% Ga, up to 5% Hg, and up to about 4% total alkalis; and up to about 20% total of anion modifiers selected from the group consisting of Cl, Br and I.

16. The method of claim 14, wherein the light is shorter than about 350 nm.

17. The method of claim 13, further comprising the step of exposing the glass to an optical interference pattern.

18. The method of claim 13 further comprising the step of selectively masking the glass to produce a periodic pattern in the glass.

19. The method of claim 13 further comprising the step of forming an optical waveguide structure comprising a core and a cladding.

20. The method of claim 19 further comprising the step of forming the glass into a fiber.

* * * * *